(12) United States Patent
Slanda et al.

(10) Patent No.: US 10,332,424 B2
(45) Date of Patent: Jun. 25, 2019

(54) TRAINING DEVICES AND METHODS OF USING THE SAME

(71) Applicant: Boston Scientific Scimed, Inc., Maple Grove, MN (US)

(72) Inventors: Jozef Slanda, Milford, MA (US); Jerry Timothy Long, Jr., Jamaica Plain, MA (US); Manuel B. Teixeira, Boston, MA (US); Sacha Tang, Marlborough, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 330 days.

(21) Appl. No.: 15/013,324

(22) Filed: Feb. 2, 2016

(65) Prior Publication Data

US 2016/0240106 A1 Aug. 18, 2016

Related U.S. Application Data

(60) Provisional application No. 62/116,063, filed on Feb. 13, 2015.

(51) Int. Cl.
*G09B 23/28* (2006.01)
*G09B 23/34* (2006.01)

(52) U.S. Cl.
CPC .......... *G09B 23/34* (2013.01); *G09B 23/285* (2013.01)

(58) Field of Classification Search
USPC ............... 434/262, 267, 268, 269, 272, 274
See application file for complete search history.

(56) References Cited

U.S. PATENT DOCUMENTS

| | | | | |
|---|---|---|---|---|
| 2,016,151 A | * | 10/1935 | Levene | G09B 23/286 378/204 |
| 4,332,569 A | * | 6/1982 | Burbank | G09B 23/285 434/272 |
| 5,795,157 A | * | 8/1998 | Weber | G09B 23/285 434/269 |
| 5,908,302 A | * | 6/1999 | Goldfarb | G09B 23/285 40/446 |
| 6,336,812 B1 | * | 1/2002 | Cooper | G09B 23/285 434/262 |
| 7,621,749 B2 | * | 11/2009 | Munday | A61M 5/427 434/262 |
| 7,837,473 B2 | * | 11/2010 | Koh | G09B 23/285 434/262 |

(Continued)

FOREIGN PATENT DOCUMENTS

| | | |
|---|---|---|
| DE | 20313207 U1 | 3/2004 |
| EP | 2296130 A2 | 3/2011 |

OTHER PUBLICATIONS

International Preliminary Report on Patentability for PCT Application No. PCT/US2016/016601, dated Aug. 24, 2017, 8 pages.

(Continued)

*Primary Examiner* — Kurt Fernstrom
(74) *Attorney, Agent, or Firm* — Brake Hughes Bellermann LLP

(57) ABSTRACT

An apparatus includes a model unit and a template member. The model unit defines a shape in the form of a portion of a body. The template member is disposed adjacent to the model unit such that a portion of the template member is disposed within the shape defined by the model unit.

8 Claims, 15 Drawing Sheets

(56) References Cited

U.S. PATENT DOCUMENTS

| | | | |
|---|---|---|---|
| 7,850,455 B2* | 12/2010 | Cottler | G09B 23/34 |
| | | | 434/262 |
| 2007/0238081 A1 | 10/2007 | Koh | |
| 2014/0134587 A1* | 5/2014 | Forte | G09B 23/30 |
| | | | 434/267 |
| 2014/0349265 A1* | 11/2014 | Park | G09B 23/32 |
| | | | 434/272 |
| 2015/0037776 A1 | 2/2015 | Redaelli et al. | |
| 2016/0148541 A1* | 5/2016 | Ristolainen | G09B 23/285 |
| | | | 434/268 |

OTHER PUBLICATIONS

User Guide: "Percutaneous Nephrolithotomy Trainer", Mar. 1, 2003, XP055267130, retrieved on Apr. 20, 2016 from http://assets.limbsandthings.com/uploads/Percutaneous_Nephrolithotomy_Trainer_User_Guide.pdf, 2 pages.

International Search report and Written Opinion for PCT/US2016/016601, dated May 2, 2016, 9 pages.

Turney, "A New Model with an Anatomically Accurate Human Renal Collecting System for Training in Fluoroscopy-Guided Percutaneous Nephrolithotomy Access", Journal of Endourology, vol. 28. No. 3, Mar. 1, 2014, pp. 360-363.

Wignall, et al., "Surgical Simulation: A Urological Perspective", Journal of Urology, vol. 179, No. 5, May 1, 2008, pp. 1690-1699.

\* cited by examiner

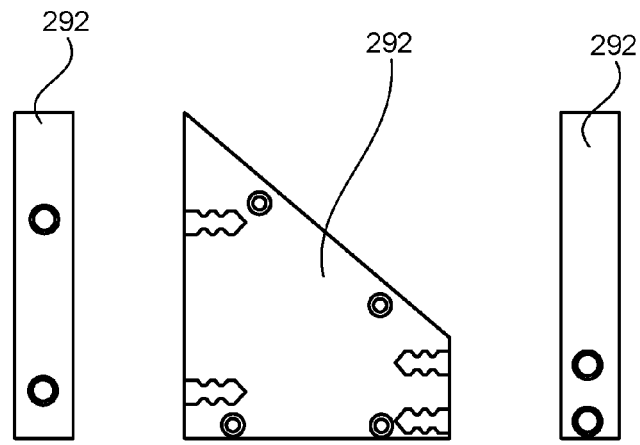
FIG. 13B  FIG. 13C
FIG. 13A
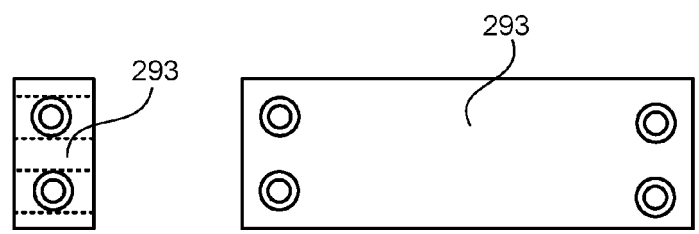
FIG. 14B  FIG. 14A
FIG. 14C FIG. 28B  FIG. 28D  FIG. 28C
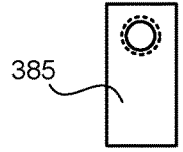
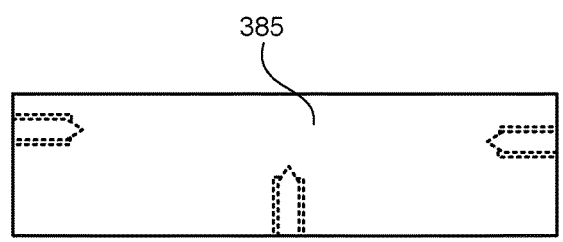
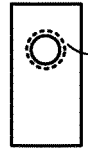
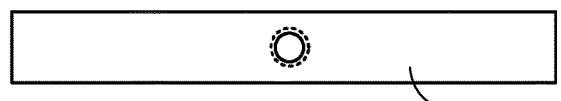
FIG. 28A
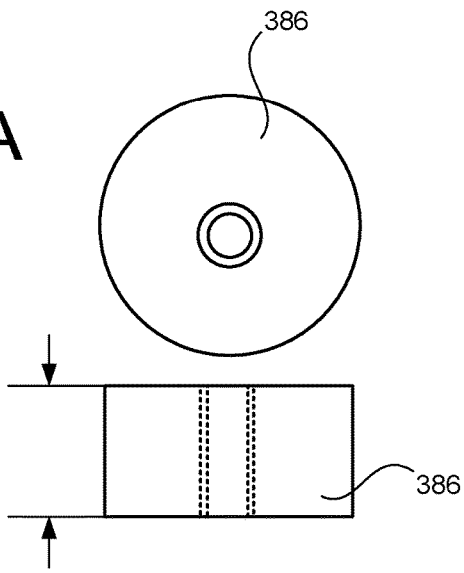
FIG. 29A
FIG. 29B

400

```
┌─────────────────────────────────────────────┐
│ Racing material simulating kidney stones into a │
│      cavity of a kidney shaped member        │
│                    410                       │
└─────────────────────────────────────────────┘
                      │
                      ▼
┌─────────────────────────────────────────────┐
│  Inserting a medical device into the cavity of the │
│  kidney shaped member to interact with the   │
│          simulated kidney stones             │
│                    420                       │
└─────────────────────────────────────────────┘
```

FIG. 30

TRAINING DEVICES AND METHODS OF USING THE SAME

CROSS-REFERENCE TO RELATED APPLICATION

This application is a Nonprovisional of, and claims priority to, U.S. Patent Application No. 62/116,063, filed on Feb. 13, 2015, entitled "TRAINING DEVICES AND METHODS OF USING THE SAME", which is incorporated by reference herein in its entirety.

TECHNICAL FIELD

The present invention generally relates to surgical training devices, methods of using surgical training devices, and methods of making surgical training devices.

BACKGROUND

Many surgical procedures require the doctor or physician to have practice or skills to successfully perform the procedure. Additionally, many surgical procedures require that a doctor or physician use an instrument, tool, or medical device to perform the procedure. Often times the doctor or physician must adapt the procedure (or the use of the instrument, tool, or medical device) to the specific needs or conditions of the patient. For example, in some cases, a doctor or physician may be required to use an instrument, tool, or medical device to remove a kidney stone from a patient. The kidney stone may be located in different portions or locations of body of the patient, such as different portions or locations within the kidney of the patient.

Accordingly, it is desirable to provide a way for doctors or physicians to practice performing surgical procedures. In some cases, it may be desirable to provide a device that doctors or physicians may use to practice performing surgical procedures or using instruments, tools, or medical devices, to perform the surgical procedure.

SUMMARY

In some embodiments, an apparatus includes a model unit and a template member. The model unit defines a shape in the form of a portion of a body. The template member is disposed adjacent to the model unit such that a portion of the template member is disposed within the shape defined by the model unit.

In some embodiments, the shape defined by the model unit is in the shape of a kidney of a mammal. In some embodiments, the template member includes a plate portion and an extension portion. In some embodiments, the template member includes a plate portion and an extension portion that is removably coupled to the plate portion. In some embodiments, the template member includes a plate portion and an extension portion, the extension portion being configured to extend into the shape defined by the model unit when the template member is disposed adjacent to the model unit.

In some embodiments, the template member is removably coupled to the model unit. In some embodiments, the template member includes a plate portion and a plurality of extension members. In some embodiments, the template member includes a plate portion and a plurality of extension members, the plurality of extension members being configured to extend into the shape defined by the model unit when the template member is disposed adjacent to the model unit.

In some embodiments, the apparatus includes a light unit disposed adjacent to the model unit. In some embodiments, the apparatus includes a light unit. The model unit is coupled to the light unit and is disposed between the light unit and the template member.

In some embodiments, a kidney shaped member defines a cavity resembling a cavity of a kidney of a mammal. The kidney shaped member has an outer layer and an inner layer. The outer layer is harder than the inner layer.

In some embodiments, the kidney shaped member defines an access port that extends into the cavity. In some embodiments, the outer layer is formed of a first material and the inner layer is formed of a second material different than the first material. In some embodiments, the outer layer is formed of a first material and the inner layer is formed of a second material different than the first material, the first material being harder than the second material.

In some embodiments, the kidney shaped member is configured to be coupled to a stand. In some embodiments, the kidney shaped member is configured to be coupled to a stand, the stand having an illumination member configured to direct light towards the kidney shaped member.

In some embodiments, a method includes placing material simulating kidney stones within a cavity of a kidney shaped member; and inserting a medical device into the cavity of the kidney shaped member to interact with the simulated kidney stones.

In some embodiments, the method includes placing a fluid within the cavity of the kidney shaped member. In some embodiments, the inserting a medical device includes inserting a lithotripsy device into the cavity of the kidney shaped member. In some embodiments, the inserting a medical device includes inserting a kidney stone retrieval device into the cavity of the kidney shaped member.

BRIEF DESCRIPTION OF THE FIGURES

The invention and the following detailed description of certain embodiments thereof may be understood with reference to the following figures.

FIGS. 12A, 12B, 12C, 12D, 13A, 13B, 13C, 14A, 14B, 14C, 15A, 15B, 15C, 16A, 16B, and 16C illustrate portions of the light unit of FIG. 11.

FIGS. 25A, 25B, 25C, 26A, 26B, 27A, 27B, 27C, 28A, 28B, 28C, 28D, and 29A and 29B illustrate portions of the stand of FIG. 22.

FIG. 30 is a flow chart of a method of using a model kidney.

DETAILED DESCRIPTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition).

Although the present invention focuses on devices, systems and methods for use modeling or practicing a urological procedure, it should be understood that the apparatuses, systems, and methods may be used to simulate or model other procedures, including other medical procedures.

Figure 1:
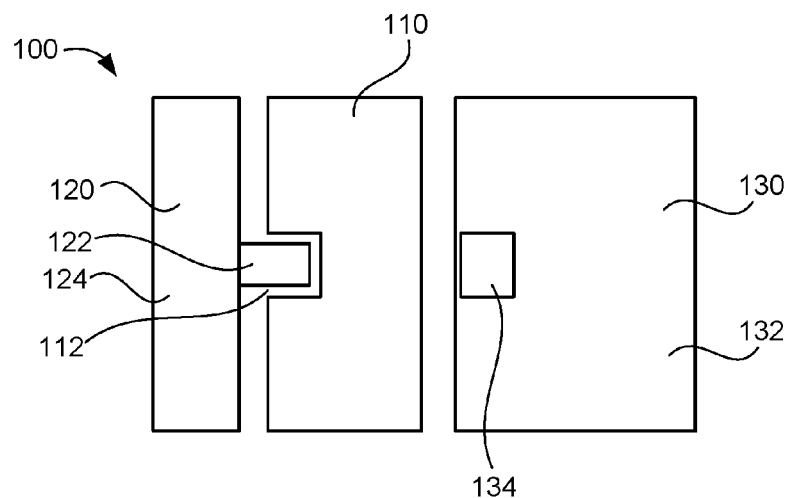
FIG. 1 is a schematic illustration of a training device system according to an embodiment of the invention.

FIG. 1 is a schematic illustration of a training device or system 100 according to an embodiment of the invention. The training device 100 includes a model unit 110, a template member 120, and a light or illumination unit 130. In the illustrated embodiment, the model unit 110 is disposed between the template member 120 and the light unit 130. In some embodiments, the model unit 110 is coupled to the light or illumination unit 130 and the template member 120 is coupled to the model unit 110. In some embodiments, the model unit 110 is removably coupled to the light unit 130. In some embodiments, the template member 120 is removably coupled to the model unit 110. For example, a first surface of the model unit 110 may be coupled to the light unit 130 and a different or opposite surface of the model unit 110 may be coupled to the template unit.

In the illustrated embodiment, the model unit 110 defines an opening 112 (or defines an open area). In some embodiments, the opening or open area 112 is in the form of a shape. In some embodiments, the opening or open area 112 is in the form or shape of a portion of a body of a mammal (such as a human). In some embodiments, the opening or open area 112 is in the form of kidney of a mammal.

In the illustrated embodiment, the template member 120 includes a base member or portion 124 and an extension portion 122. In the illustrated embodiment, the extension portion 122 is configured to extend into or be disposed within the opening 112 of the model unit 110. In some embodiments, the extension portion 122 is configured to extend into or be disposed within the opening 112 of the model unit when the template member 120 is disposed adjacent to the model unit 110. In some embodiments, the template member 120 is removably coupled to or configured to be coupled to the model unit 110. In such embodiments, the extension portion 122 may be configured to extend into the opening 112 defined by the model unit 110 when the template member 120 is coupled to the model unit 110.

The light or illumination unit 130 is configured to direct light towards or through the model unit 110 and the template member 120. In some embodiments, the model unit 110 and the template member 120 are formed of transparent or semitransparent materials to facilitate the transmission of the light through the model unit 110 and the template unit 120.

In some embodiments, the light or illumination unit 130 includes a housing 132 and a light member 134. The housing 132 is configured to be coupled to and provide support to the model unit 110. In some embodiments, the light member 134 is disposed within the housing 132 and is configured to produce light and direct such light towards the model unit 110. In some embodiments, the light member 134 is a light bulb. In other embodiments, the light member is a light emitting diode or other light emitting device.

The training device 100 may be used, for example, by a medical practitioner to simulate a medical procedure. For example, in some embodiments, the model unit 110 may represent a portion of a body of a mammal or patient and the medical practitioner may insert medical tools into the opening 112 of the model unit 110 to simulate or practice medical procedure.

In some embodiments, the opening of the model unit 110 may be in the shape of a kidney of a mammal and the extension portion 122 of the template member 120 may be in the form or simulate a kidney stone. The medical practitioner may insert a medical device, such as a guide wire and/or a catheter, into the opening 112 of the model unit 110 and interact with the extension portion 122 of the template member 120. Accordingly, the medical practitioner may simulate the interaction and/or removal of kidney stones from a kidney of a patient.

In some embodiments, the model unit 110, the template member 120, and the light member 134 are packaged together as a kit. In some embodiments, the kit may include more than one template member 120. For example, in some embodiments, the one template member may have extension portions (for example, simulating kidney stones) at one set of locations and a second template member may have extension portions (for example, simulating kidney stones) at a different set of locations. Accordingly, the medical practitioner may be able to simulate the interaction and/or removal of kidney stones from different locations within the opening 112 of the model unit 110 (which would simulate different locations within a kidney of a patient).

Figure 2:
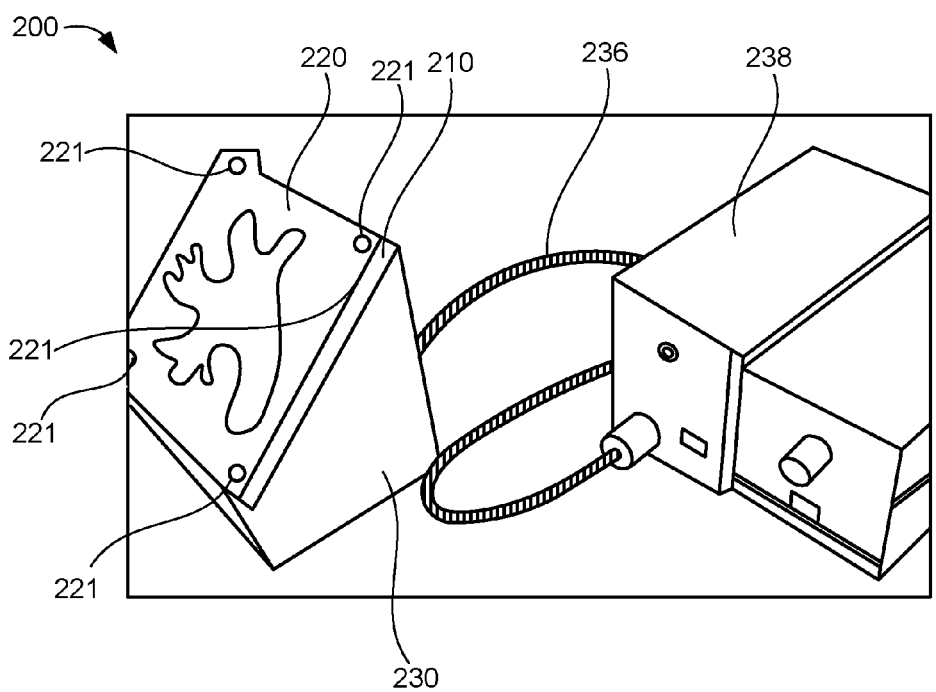
FIG. 2 is a perspective view of a training device according to an embodiment of the invention.
Figure 3:
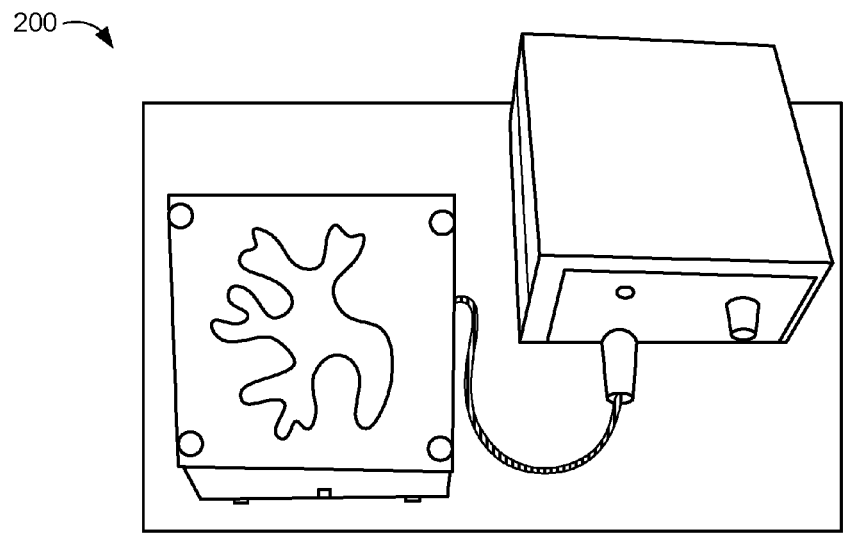
FIG. 3 is a top view of the training device of FIG. 2.
Figure 4:
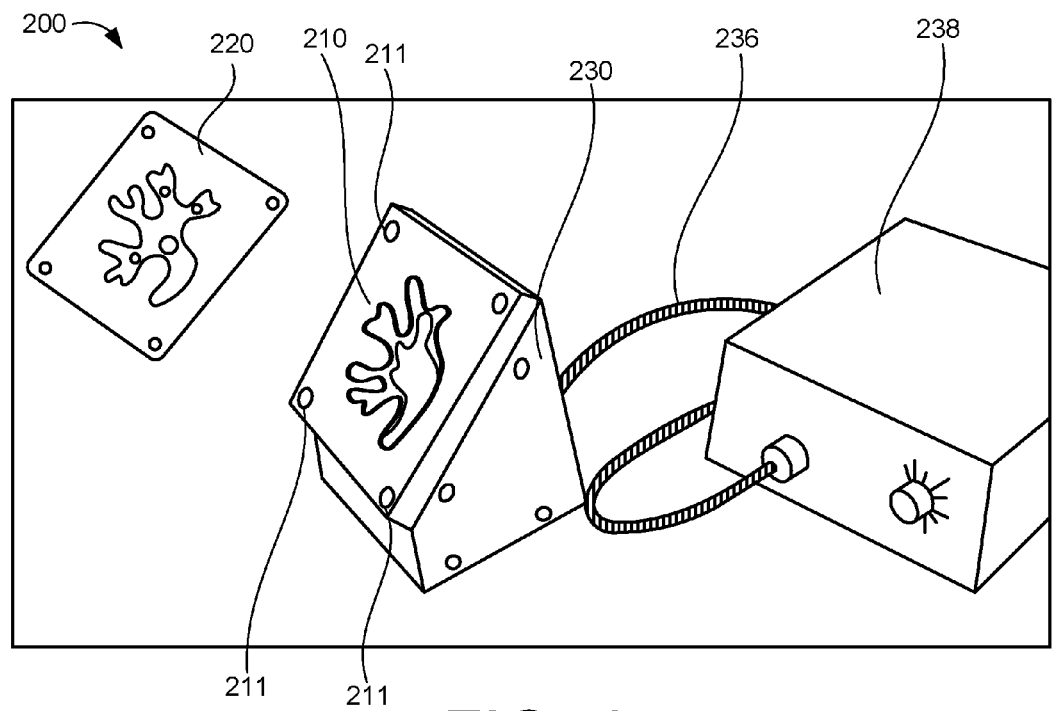
FIG. 4 is an exploded view of the training device of FIG. 2.

FIGS. 2-4 illustrate a device or a training device 200 according to an embodiment of the invention. The training device 200 includes a model unit 210, a template member 220, and a light or illumination unit 230. In the illustrated embodiment, the model unit 210 is disposed between the template member 220 and the light unit 230. In the illustrated embodiment, the model unit 210 is coupled to or is configured to be coupled to the light or illumination unit 230 and the template member 220 is coupled to or configured to be coupled to the model unit 210. In some embodiments, the model unit 210 is removably coupled to the light unit 230.

In some embodiments, the template member 220 is removably coupled to the model unit 210. For example, a first surface of the model unit 210 may be coupled to the light unit 230 and a different or opposite surface of the model unit 210 may be coupled to the template unit.

In some embodiments, couplers 211 are used to removably couple the model unit 210 to the light or illumination unit 230. In other embodiments, screws, bolts, fasteners or other types of coupling devices are used to the removably couple the model unit 210 to the light or illumination unit 230.

In some embodiments, couplers 221 are used to removably couple the template member 220 to the model unit 210. In other embodiments, screws, bolts, fasteners or other types of coupling devices are used to removably couple the template member 220 to the model unit 210.

Figure 5:
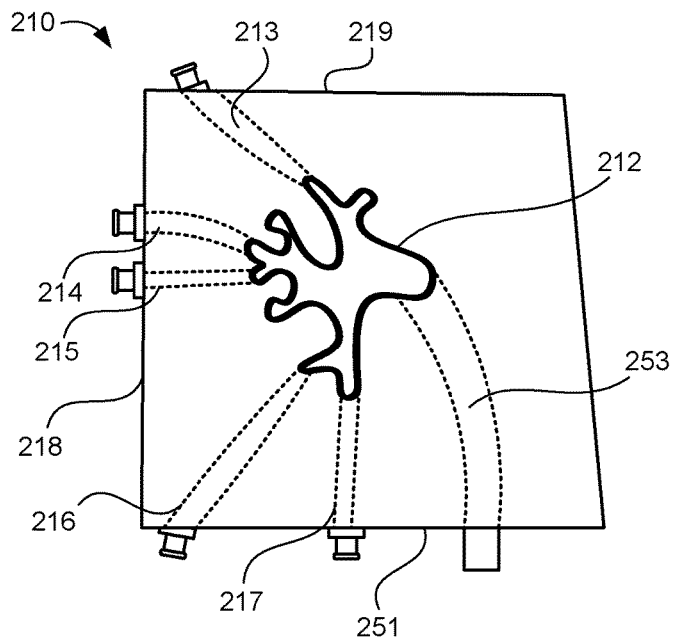
FIG. 5 is a top view of the model unit of the training device of FIG. 2.

FIG. 5 is a top view of the model unit 210 of the device 200. In the illustrated embodiment, the model unit 210 defines an opening 212 (or defines an open area). In some embodiments, the opening or open area 212 is in the form of a shape. In some embodiments, the opening or open area 212 is in the form or shape of a portion of a body of a mammal (such as a human). In the illustrated embodiment, the opening or open area 212 is in the form of kidney of a mammal.

In the illustrated embodiment, the model unit 210 includes or defines passageways that extend from an edge of the model unit 210 to the opening or open area 212. For example, passageway 213 extends from edge 219 to the opening 212. Passageways 214 and 215 extend from edge 218 to the opening 212. Passageways 216 and 217 extend from edge 251 to the opening 212.

The passageways 213, 214, 215, 216, and 217 may be located at likely or common entry points for accessing a kidney. In some embodiments, the different passageways 213, 214, 215, 216, and 217 are of different sizes or different diameters. For example in some embodiments, one of the passageways may be configured to receive or fit a medical device (such as a guidewire or a catheter) that is 7 French (F) in size. Another of the passageways may be configured to receive or fit a medical device 8 F in size. Yet another of the passageways may be configured to receive or fit a medical device 10 F in size.

In the illustrated embodiment, the model unit 210 also includes or defines a passageway 253 that extends into the opening or open area 212. The passageway 253 may simulate or be shaped similar to a ureter of a mammal.

Figure 6:
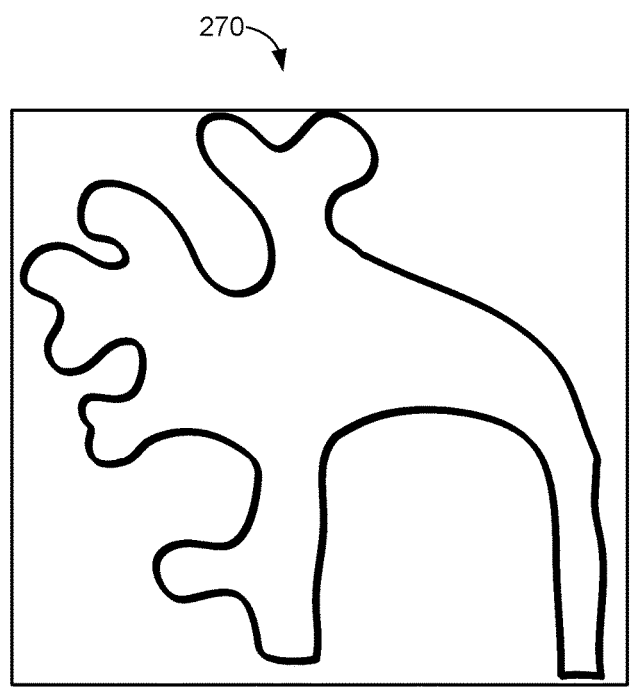
FIG. 6 is a top view of a mold used to form a model unit according to an embodiment of the invention.

In some embodiments, the model unit 210 may be formed of transparent or semi-transparent material. In some embodiments, the model unit 210 may formed or made using a molding process. For example, in some embodiments, as illustrated in FIG. 6, a model kidney and ureter 270 (or portion of a ureter) may be formed. In some embodiments, molding clay may be used to form the model kidney.

The model kidney 270 formed of clay may then be used to make a mold of the kidney. The model kidney 270 may be of any size. For example. In some embodiments, the model kidney 270 is of a size similar to a human kidney. In some embodiments, the model kidney is about 0.6 inches (about 1.5 cm) thick. In some embodiments, a silicone mold may be formed around the clay kidney 270. The mold may then be used to form a simulated kidney. In some embodiments, the simulated kidney is formed of a casting resin.

Figure 7:
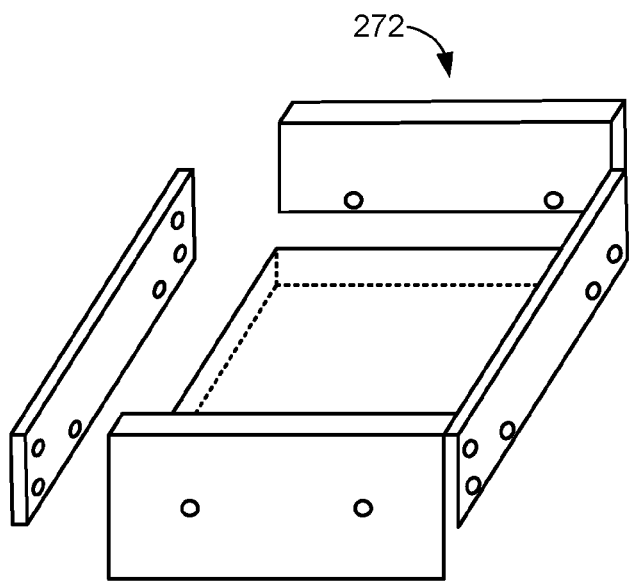
FIG. 7 is an exploded view of a box used in the process to form the model unit according to an embodiment of the invention.
Figure 8:
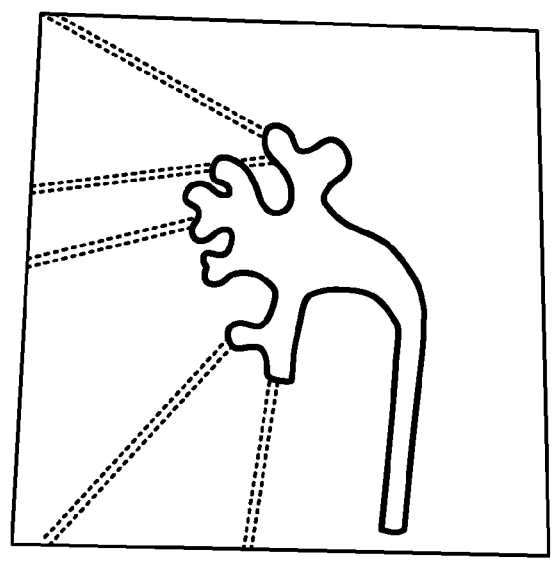
FIG. 8 is a top view of a box and mold used to form the model unit according to an embodiment of the invention.

A box 272 may then be formed as illustrated in FIG. 7. In some embodiments, the box may be formed of any material, such as a polycarbon, polycarbonate or a thermoplastic polymer. The simulated kidney may then be placed in the box 272. In some embodiments, holes may be drilled into the simulated kidney at the desired locations for the passageways. Objects, such as mandrels, of the desired passageway sizes may then be inserted into the drilled holes. The simulated kidney may then be arranged in the box such that the ureter portion and the objects extend from the box (as illustrated in FIG. 8. Casting resin (such as silicone P-10 or P-15) may then be poured or placed into the box 272. The box and its contents may then be placed in a pressure vessel. In some embodiments, the box 272 and its contents remain in the pressure vessel under pressure for a period of time. In some embodiments, the box 272 and its contents remain in the pressure vessel under pressure for about 12 hours. The contents of the box 272 may then be removed and the resin may be separated from the simulated kidney. Accordingly, the formed resin forms the model unit. The box 272 may be of any size. In some embodiments, the box is about 6 inches (about 15.2 cm) wide, by about 6.5 (about 16.5 cm) inches long and about 1.4 (about 3.6 cm) inches deep. In some embodiments, the interior of the box may have one or more curved surfaces, straight surfaces, or a combination of curved and straight surfaces, such that the interior of the box defines a mold cavity shape. The mold cavity shape may be any of cylinder, half-cylinder, quarter-cylinder, dome, rectangle, square, triangle, wedge, or polygon. The mold cavity shape may be selected to reduce glare or reflection on the surface of the model unit. The surface of the model unit may be roughened or abraded or coated with a glare-reducing material or film such as polyester to reduce glare.

Figure 9:
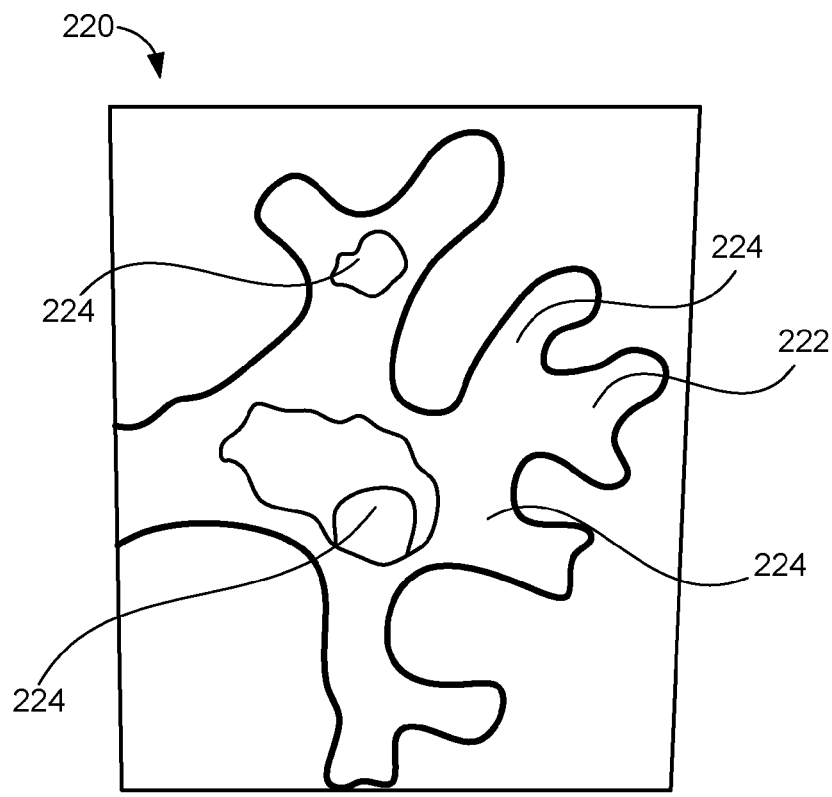
FIG. 9 is a top view of the template member of the training device of FIG. 2.
Figure 10:
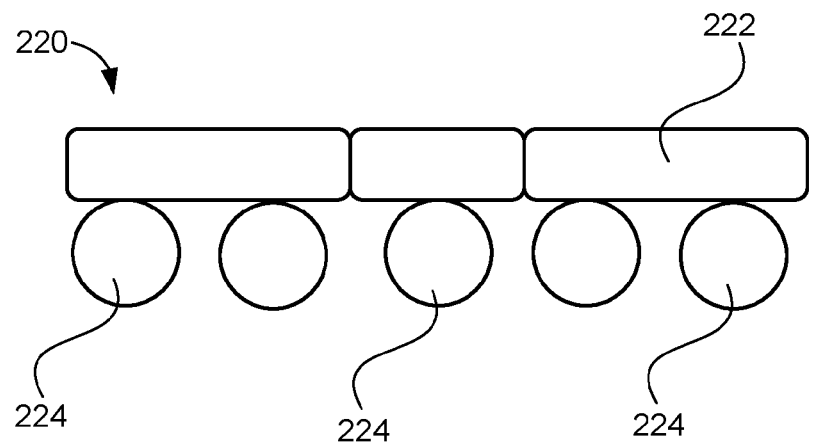
FIG. 10 is a side view of the template member of the training device of FIG. 2.

FIGS. 9 and 10 illustrate the template member 220. The template member 220 includes a base member or portion 222 and extension portions 224. In the illustrated embodiment, the extension portions 224 are configured to extend into or be disposed within the opening 212 of the model unit 210. In some embodiments, the extension portion 224 is configured to extend into or be disposed within the opening 212 of the model unit 210 when the template member 220 is disposed adjacent to the model unit 210. In some embodiments, the template member 220 is removably coupled to or configured to be coupled to the model unit 210. In such embodiments, the extension portion 224 may be configured to extend into the opening 212 defined by the model unit 210 when the template member 220 is coupled to the model unit 210.

In the illustrated embodiment, the extension portions 224 are removably coupled to the base member 222. Accordingly, the extension portions 224 may be removed from or coupled to the base member 222. In some embodiments, the base member 222 includes posts that the extension portions 224 may be removably coupled to. In the illustrated embodiment, the extension portions 224 are spherical in shape and are formed to resemble kidney stones. In other embodiments, the extension portions 224 are of a different shape and/or are formed to represent different objects.

In some embodiments, the template member 220 is formed of a transparent or semitransparent material. For example, in some embodiments, the template member 220 is formed of a polycarbon, polycarbonate or thermoplastic polymer such as a polycarbonate plate or polycarbonate film. In some embodiments, the template member 220 is about 0.02 inches thick.

Figure 11:
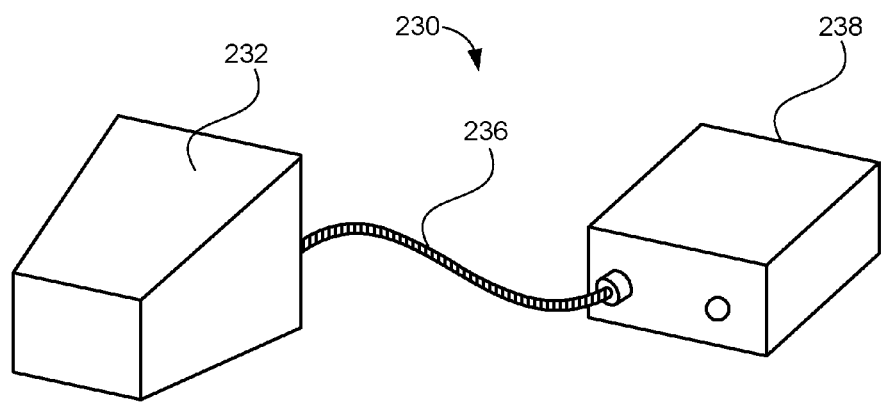
FIG. 11 is a perspective view of the light unit of the training device of FIG. 2.
Figures 12A, 12B, 12D:
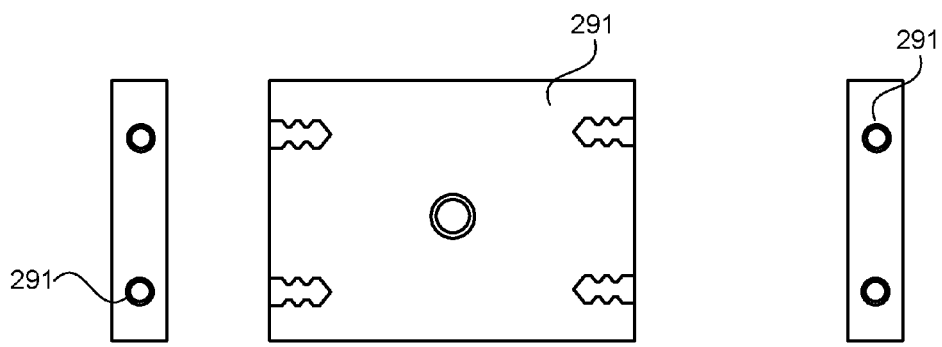
Figure 12C:

FIG. 11 is a perspective view of the light or illumination unit 230. The light or illumination unit 230 is configured to direct light towards or through the model unit 210 and the template member 220. In some embodiments, the model unit 210 and the template member 220 are formed of transparent or semitransparent materials to facilitate the transmission of the light through the model unit 210 and the template unit 220.

The light or illumination unit 230 includes a housing 232, a fiber optic cable 236, a control box 238, and a light member disposed within the control box 238. The housing 232 is configured to be coupled to and provide support to the model unit 210. In the illustrated embodiment, the light member is disposed within the control box 238 and is configured to illuminate or direct light into the housing and through the model unit 210 and the template member 220 via the fiber optic cable 236. The control box 238 is configured to house the light member and control the light member. For example, the control box 238 may include an on/off control as well as an intensity control for the light member. In some embodiments, the light member is a light bulb. In other embodiments, the light member is a light emitting diode or other light emitting device.

Figures 15A, 15B, 15C:
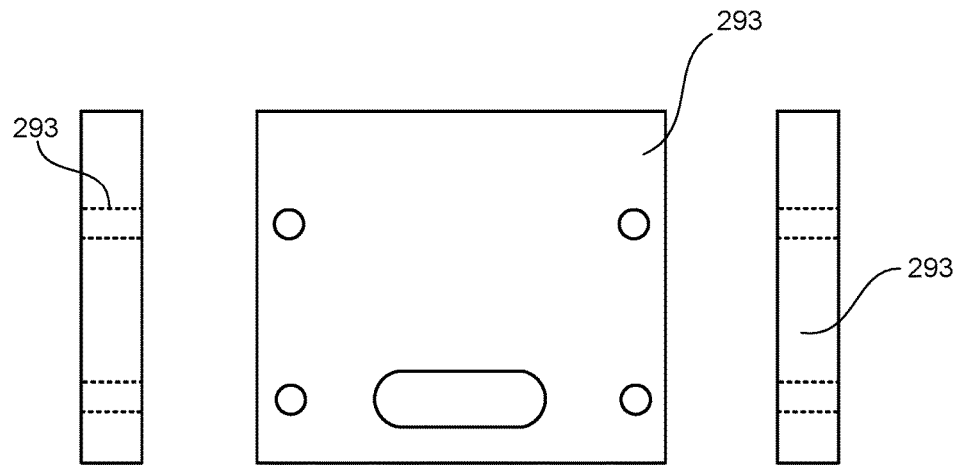
Figures 16A, 16B, 16C:
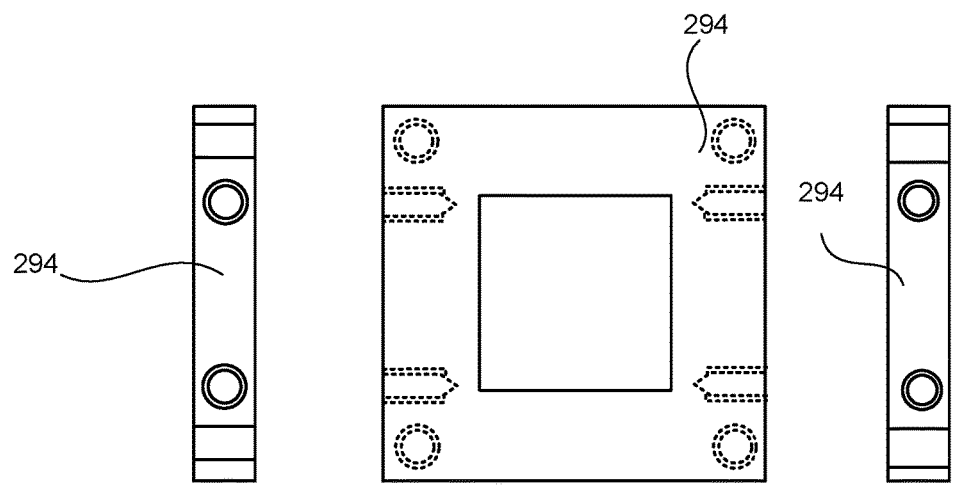

FIGS. 12A, 12B, 12C, and 12D illustrate a base portion or panel 291 of the housing 232 of the light or illumination unit 230. FIGS. 13A, 13B, and 13C illustrate a side portion or panel 292 of the housing 232 of the light or illumination unit 230. FIGS. 14A, 14B, and 14C illustrate a front portion or panel 293 of the housing 232 of the light or illumination unit 230. FIGS. 15A, 15B, and 15C illustrate a rear portion or panel 293 of the housing 232 of the light or illumination unit 230. FIGS. 16A, 16B, and 16C illustrate a top portion or panel 294 of the housing 232 of the light or illumination unit 230. The housing 292 can be of any size or shape. In one embodiment, the housing is about 4 inches (about 10.2 cm) wide and about 5.6 (about 14.2 cm) inches long.

The training device 200 may be used, for example, by a medical practitioner to simulate a medical procedure. For example, in some embodiments, the model unit 210 may represent a portion of a body of a mammal or patient and the medical practitioner may insert medical tools into the opening 212 of the model unit 210 to simulate or practice medical procedure.

In the illustrated embodiment, the opening 212 of the model unit 210 is in the shape of a kidney of a mammal and the extension portion 224 of the template member 220 is in the form or simulates a kidney stone. The medical practitioner may insert a medical device, such as a guide wire and/or a catheter, into the opening 212 of the model unit 210 and interact with the extension portion 224 of the template member 220. Accordingly, the medical practitioner may simulate the interaction and/or removal of kidney stones from a kidney of a patient. As described above, the model unit 210 includes or defines a plurality of passageways that extend to the opening 212 of the model unit 210. Accordingly, a medical practitioner may use the training device with medical devices of a variety of different sizes.

Figure 17:
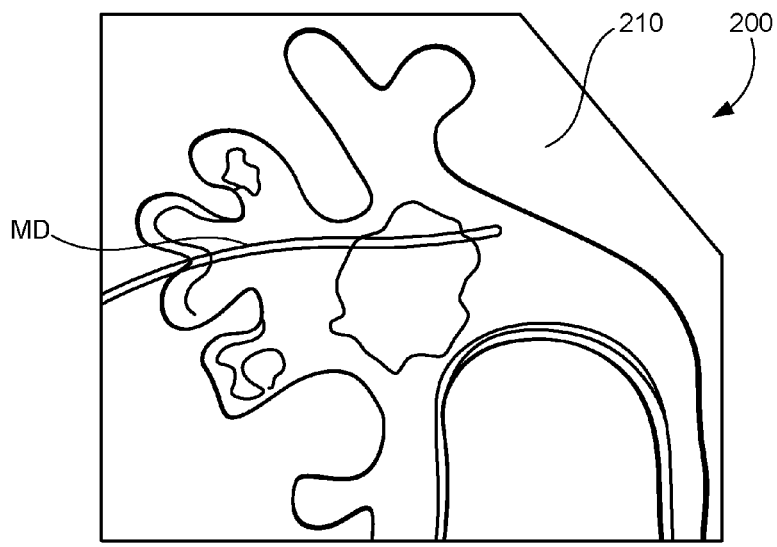
FIG. 17 is a top view of the training device of FIG. 2 with a medical device disposed within the training device.

FIG. 17 illustrates a medical device or medical tool MD inserted into or disposed within the model unit 210 of the training device 200. In some embodiments, the illumination of the tool within the model unit 210 of the training device 200 simulates or models the view that a physician may have during an actual surgical procedure (such as with a fluoroscopy spot image). In some embodiments, the view of the medical device within the training device 200 is obscured without the illumination unit being activated. According, in such embodiments, that illumination unit may be activated at various points or times of the training to give the practitioner an indication as to the progress of the simulated procedure.

In some embodiments, the model unit 210, the template member 220, and the light unit 230 are packaged together as a kit. In some embodiments, the kit may include more than one template member 1220. For example, in some embodiments, the one template member may have extension portions (for example, simulating kidney stones) at one set of locations and a second template member may have extension portions (for example, simulating kidney stones) at a different set of locations. Accordingly, the medical practitioner may be able to simulate the interaction and/or removal of kidney stones from different locations within the opening 212 of the model unit 210 (which would simulate different locations within a kidney of a patient).

Figure 18:
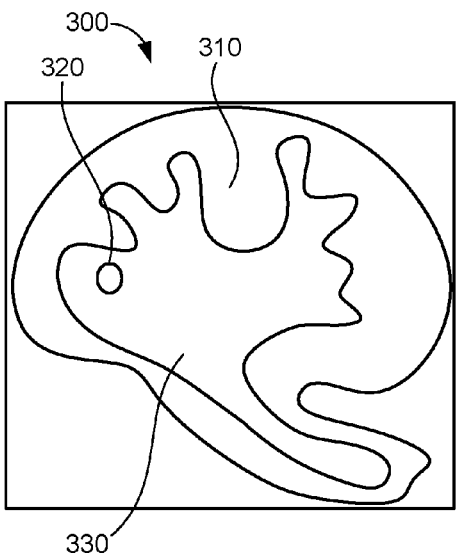
FIG. 18 is a top view of a model kidney in accordance with an embodiment of the invention.
Figure 19:
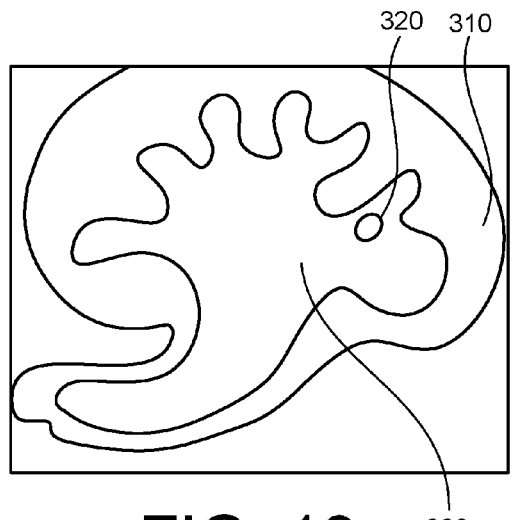
FIG. 19 is a bottom view of the model kidney of FIG. 18.

FIGS. 18 and 19 illustrate a model kidney 300 in accordance with an embodiment of the invention. In the illustrated embodiment, the enclosed or substantially enclosed (includes or defines a limited number of access passageways). In the illustrated embodiment, the model kidney 300 is opaque or formed of an opaque material. In other embodiments, the model kidney is transparent or semitransparent or formed of transparent or semitransparent materials.

In the illustrated embodiment, the model kidney 300 includes an outer layer or surface 310 and an inner layer 320. In some embodiments, the outer layer 310 is solid, hard, or rigid. For example, in some embodiments, the outer layer 310 may be formed of a material that is hard or rigid. In some embodiments, the inner layer 320 is softer than the outer layer 310. For example, in some embodiments, the inner layer or liner 320 is softer than the outer layer 310 and is configured to absorb the impact of pneumatic and/or ultrasonic waves or energy. For example, in some embodiments, the inner layer 320 is configured to absorb the impact of pneumatic and/or ultrasonic lithotripsy devices.

In the illustrated embodiment, the model kidney 300 defines a cavity or open area 330. The cavity or open area 330 is shaped to simulate a kidney of a mammal, such as a human kidney. In other embodiments, the cavity or open space may have a different shape or may have a shape of a different body part, such as urethra, bladder, or ureter.

Figure 21:
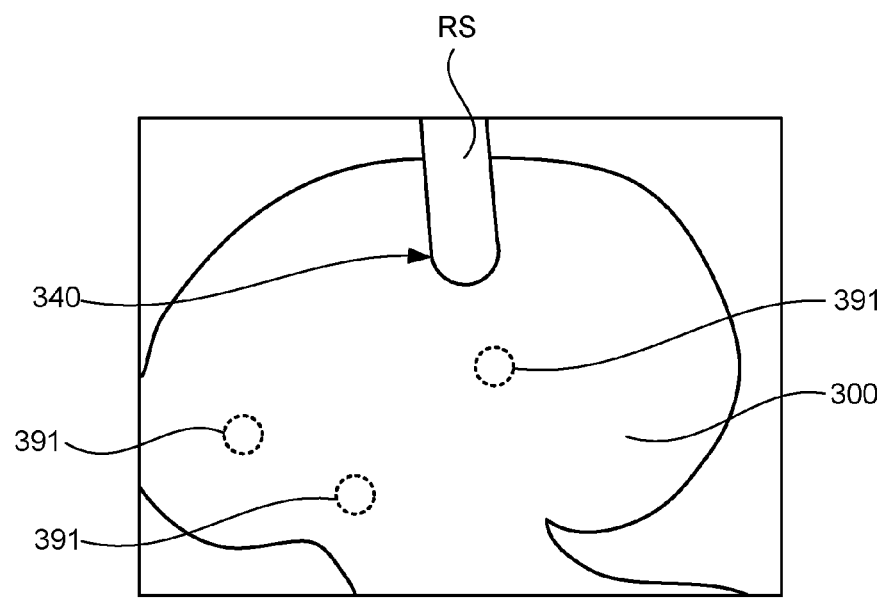
FIG. 21 is a top view of the model kidney of FIG. 18 and a renal sheath.

As best illustrated in FIG. 21, the model kidney 300 also includes or defines an access port 340. The access port 340 extends from the outer layer 310 of the model kidney 300 to the cavity or open area 330. In some embodiments, the access port 340 is configured to receive a renal sheath. For example, in some embodiments, the access port 340 is a 30 F access port.

In some embodiments, the model kidney 300 may be formed using a molding process. In some embodiments, molding material, such as molding clay, is used to form a calyx model (a clay formation that resembles the inside or cavity of a kidney of a mammal). Molding material, such as molding clay, is also used into a shape or form that resembles the outside of a kidney of a mammal. Molding boxes may then be made, one to fit the calyx model and another to fit the model of the outside of the kidney. Silicone mold casts of the calyx model and the model that resembles the outside of a kidney using the molds and the boxes.

Figure 20:
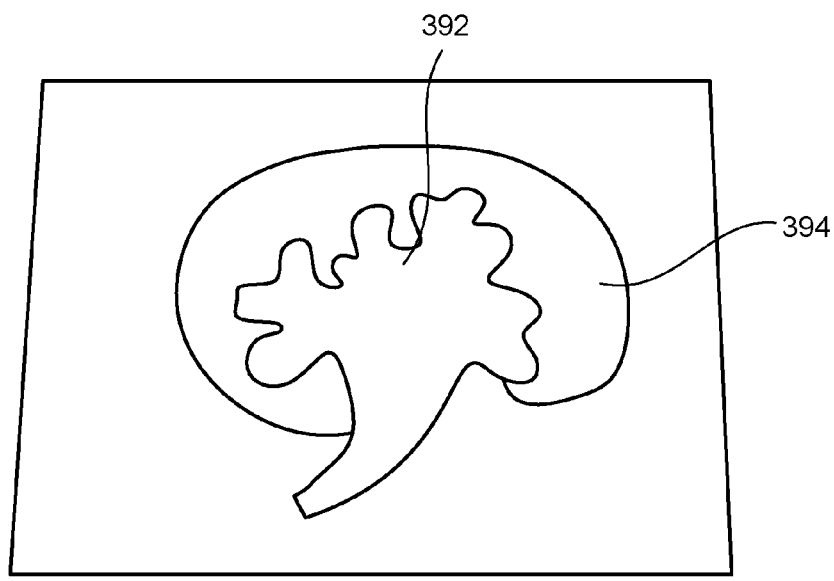
FIG. 20 is a top view of a mold for forming a model kidney according to an embodiment of the invention.

Using the calyx molding cast, a wax model of the calyx may be made. When the wax has cured, the wax 392 may be removed from the molding cast and placed into the cast 394 that resembles the outside of the kidney (as illustrated in FIG. 20). Material, such as silicone XP565, may then be poured into the cast that resembles the outside of the kidney (over the wax model of the calyx). The cast and its contents may then be placed under pressure (such as in a pressure chamber) for about 10 hours. In some embodiments, the cast and its contents are placed in a pressure chamber for between 10 and 12 hours. In other embodiments, the cast and its contents are placed in a pressure chamber for more than 12 hours. In other embodiments, the cast and its contents are placed in a pressure chamber for less than 10 hours. The contents of the cast may then be removed from the cast and the wax may be washed away with hot water or melted away in an oven. Accordingly, the model kidney 300 is formed.

In some embodiments, the model kidney 300 is formed of a single material and has a single hardness throughout. In other embodiments, the model kidney 300 may have an outer surface that is harder or stiffer than the inner portion of the model kidney 300. For example, in some embodiments, the softer inner portion of the model kidney 300 may be dipped in a material that when dry is harder than the inner portion of the model kidney 300. Accordingly, in such embodiments, once the outer material (which may be a material different than then material of the inner portion) dries, the model kidney 300 will have a harder outer surface or layer.

In some embodiments, the model kidney 300 may be used to train medical practitioners or to simulate medical procedure. For example, in some embodiments, the model kidney 300 may be used to simulate a lithotripsy and stone removal procedures. In some embodiments, simulated kidney stone material may be inserted into the model kidney (for example, via a 30 F renal sheath RS disposed within the access port 340). Saline or sterile water may also be inserted into the model kidney.

A physician or medical practitioner may then remove the simulated kidney stone material. For example, in some embodiments, the physician or medical practitioner may use a lithotripsy device and stone retrieval devices to remove the simulated stone material from the model kidney 300 (for example, via the access port 340 or the renal sheath RS disposed within the access port 340). In some embodiments, the physician or medical practitioner may use a lithotripsy device (or an alternative device) to break up the simulated stone material. The physician or medical practitioner may then ensure that the model kidney is stone free by removing the fragments using a cystoscope or other retrieval devices (such as a basket or other device).

In some embodiments, the model kidney 300 may include coupling members that are configured to be removably coupled to the simulated kidney stone material. For example, in the illustrated embodiment, magnetic coupling members 391 are coupled within the model kidney 300. The simulated kidney stone material may include metal fibers or shaving or other material configured to be removably coupled to the magnetic coupling member 391. In some embodiment, the magnetic coupling members 391 are disposed with the material of the model kidney 300 during the casting process. In some embodiments, the coupling members are coupled to the model kidney is calyxes or calyx regions of the model kidney.

Figure 22:
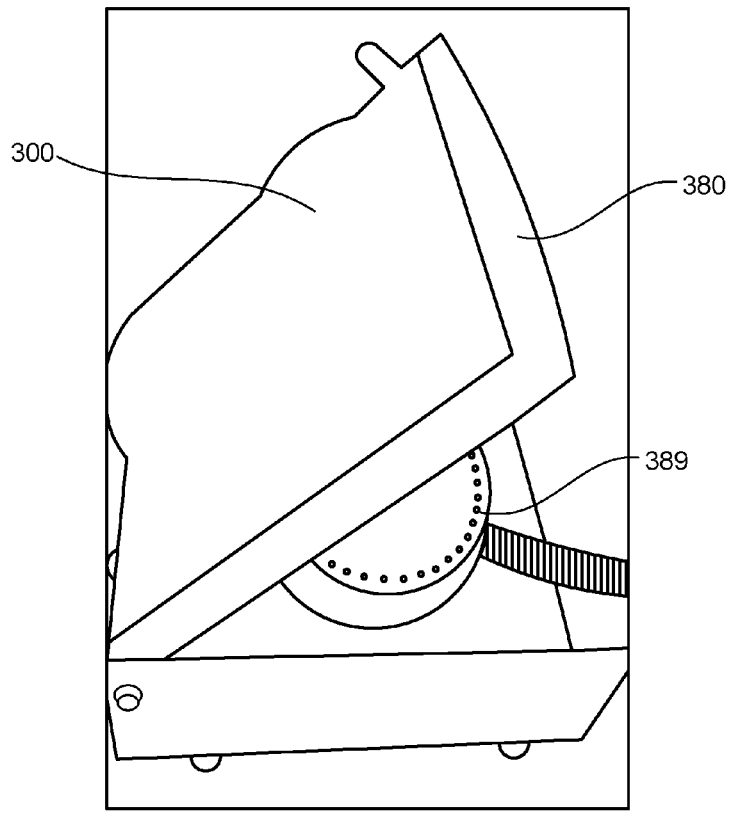
FIG. 22 is a perspective view of the model kidney disposed on a stand.
Figure 23:
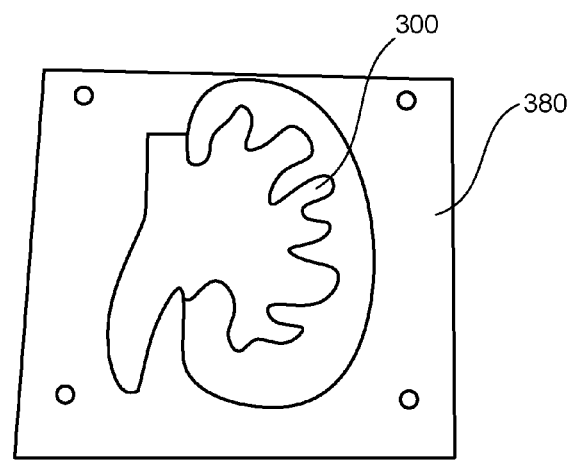
FIG. 23 is a top view of the model kidney disposed on a stand.

As illustrated in FIGS. 22 and 23, the model kidney 300 may be placed or used with a stand or a support member 380. In some embodiments, the stand or support member 380 is configured to place or retain the model kidney 300 at an angle with respect to a support surface. In some embodiments, the stand or support member 380 is configured to place or retain the model kidney 300 at a proper lithotripsy orientation. For example, in some embodiments, the stand or support member 380 is configured to place or retain the model kidney 300 at an angle of between 30 degrees and 45 degrees from the support surface. In other embodiments, the stand or support member 380 is configured to place or retain the model kidney 300 at an angle of less than 30 degrees or an angle of greater than 45 degrees from the support surface. In some embodiments, the stand or support member 380 is adjustable and is configured to place or retain the model kidney 300 at different positions or angles.

In some embodiments, the model kidney 300 is configured to be coupled to the stand or support member 380. In some embodiments, the model kidney 300 is configured to be removably coupled to the support member 380. For example, in some embodiment, couplers may be used to removably couple the model kidney 300 to the support member 380.

As best illustrated in FIG. 22, the stand or support member 380 includes an illumination member or light source 389. The illumination member or light source 389 is configured to direct light towards the model kidney 300 when the model kidney 300 is disposed on the stand 380. In some embodiments, the illumination of the model kidney 300 may help facilitate the visualization of the simulated kidney stones in the model kidney 300.

Figure 24:
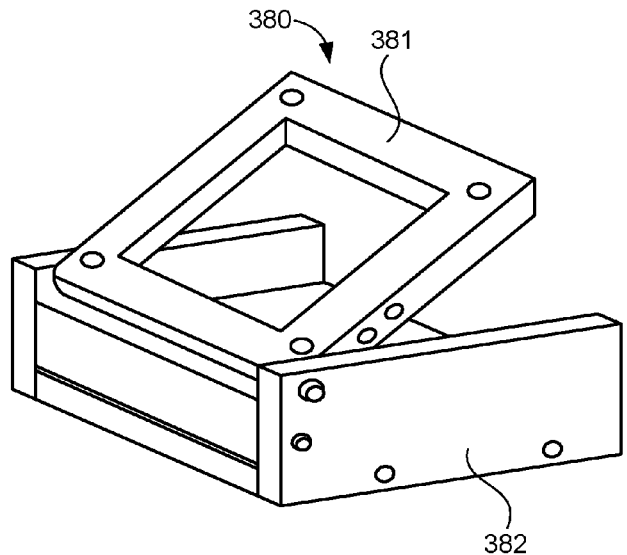
FIG. 24 is a perspective view of the stand of FIG. 22.

FIG. 24 is a perspective view of the stand or support member 380. The stand or support member 380 includes a mounting plate or portion 381 and a base portion 382. In some embodiments, the mounting plate or portion 381 is configured to be coupled to the model kidney 300. In some embodiments, the mounting plate or portion 381 is configured to move or pivot with respect to the base portion 382.

Figures 25A, 25B, 25C:
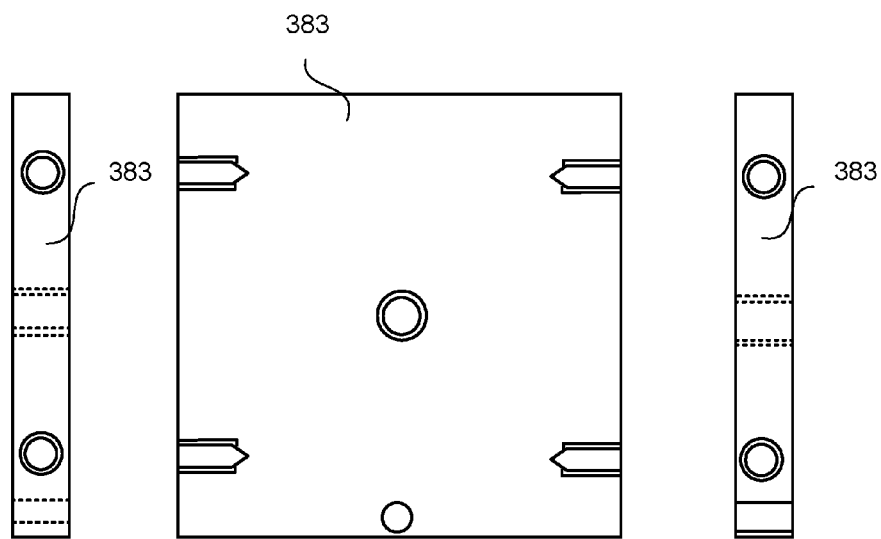
Figures 26A, 26B:
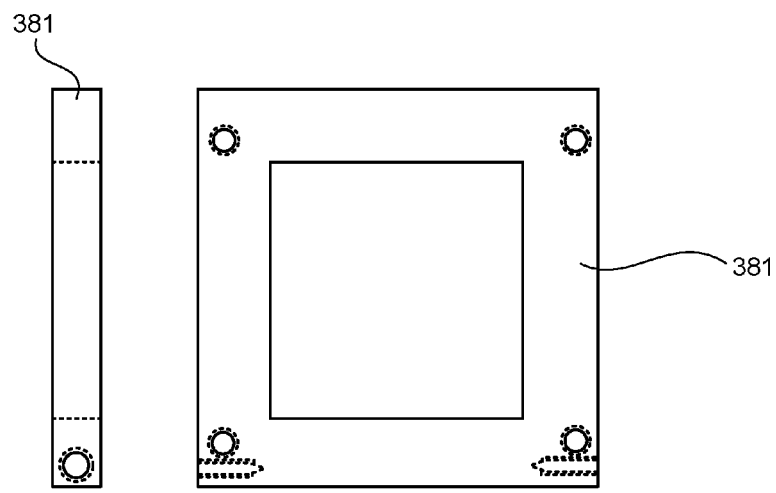
Figures 27A, 27B, 27C:
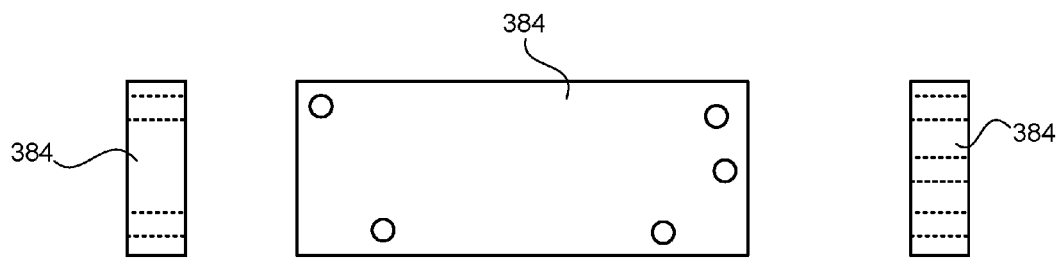

FIGS. 25A, 25B, and 25C illustrate a base or bottom plate 383 of the base member 382 of the stand 380. FIGS. 26A and 26B illustrate the mounting plate 381. FIGS. 27A, 27B, and 27C illustrate a side portion or side plate 384 of the support member 380. FIGS. 28A, 28B, 28C, and 28D illustrate a front plate or portion 385 of the support member 380. FIGS. 29A and 29B illustrate a mounting portion 386 that is configured to mount a light or illumination source 389.

FIG. 30 is a flow chart illustrating a method 400 according to an embodiment of the invention. At 410, material simulating kidney stones is placed into a cavity of a kidney shaped member. At 420, a medical device is inserted into the cavity of the kidney shaped member to interact with the simulated kidney stones. In some embodiments, the medical device is a lithotripsy device. In some embodiments, the medical device is a kidney stone retrieval device. In some embodiments, a lithotripsy device is inserted and used to break up the simulated kidney stones and then a retrieval device is inserted to remove the fragments of the simulated kidney stones.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the disclosure.

What is claimed is:

1. An apparatus, comprising:
a model unit, the model unit defining a shape in the form of a portion of a body; and
a template member disposed adjacent to the model unit such that a portion of the template member is disposed within the shape defined by the model unit,
wherein the template member includes a plate portion and an extension portion that is configured to be removably coupled to the plate portion, the extension portion extends in a direction orthogonal with respect to a surface of the plate portion.

2. The apparatus of claim 1, wherein the shape defined by the model unit is in the shape of a kidney of a mammal.

3. The apparatus of claim 1, wherein the extension portion is configured to extend into the shape defined by the model unit when the template member is disposed adjacent to the model unit.

4. The apparatus of claim 1, wherein the template member is removably coupled to the model unit.

5. The apparatus of claim 1, wherein the plate portion includes a plurality of extension members.

6. The apparatus of claim 1, wherein the plate portion includes a plurality of extension members, the plurality of extension members being configured to extend into the shape defined by the model unit when the template member is disposed adjacent to the model unit.

7. The apparatus of claim 1, further comprising: a light unit disposed adjacent to the model unit.

8. The apparatus of claim 1, further comprising: a light unit, the model unit being coupled to the light unit and being disposed between the light unit and the template member.

* * * * *